V. G. APPLE.
METHOD OF WELDING.
APPLICATION FILED MAR. 6, 1919.
1,332,155. Patented Feb. 24, 1920.
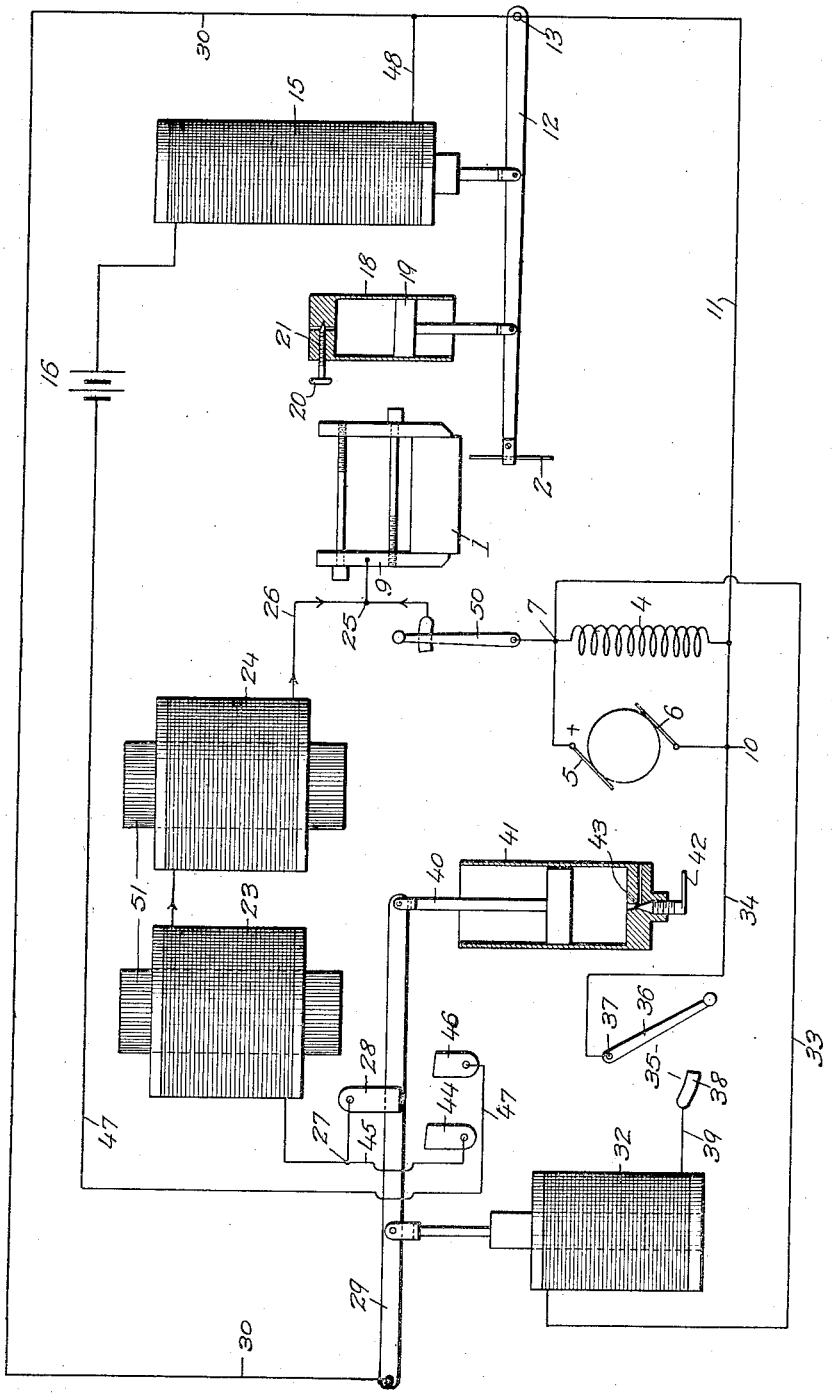

UNITED STATES PATENT OFFICE.

VINCENT G. APPLE, OF DAYTON, OHIO.

METHOD OF WELDING.

1,332,155.  Specification of Letters Patent.  Patented Feb. 24, 1920.

Application filed March 6, 1919. Serial No. 280,993.

*To all whom it may concern:*

Be it known that I, VINCENT G. APPLE, a citizen of the United States, residing at Dayton, in the county of Montgomery and State of Ohio, have invented certain new and useful Improvements in Methods of Welding, of which the following is a specification.

One of the objects of my invention is to provide a method of welding objects together and it has especial reference to the art of welding together objects that vary largely in weight and dimensions with respect to each other.

By other methods of welding, with which I am familiar, when it is desired to weld one object which is much larger than the object to which it is to be welded, some means has heretofore been required to preheat the larger object to near the welding point before the smaller object is heated. This results in a useless waste of time and energy.

In carrying out my mode of procedure, the heat applied to the larger object is localized and the weld union is accomplished before, in point of time, the larger object can conduct the applied heat away from the part to which the smaller object is to be united. I accomplish this result by ionizing the space between the electrodes, constituting the parts to be welded together, by connecting both objects to a circuit that is opened only by their separation and I then spring an arc between the electrodes, resulting from the abrupt discharge of a highly inductive circuit to which both of the objects are also connected and before the localized heat in the larger body, produced by the current impact, can be conducted away, the bodies are automatically brought together with sufficient effect to produce the required mechanical pressure for completing the welded union.

If a mass of gun cotton be unconfined in the open air and ignited at one point, it will produce but little effect upon any object placed below it, because, under the conditions mentioned, the propagation of flame is relatively slow, and for this reason there is practically entire absence of impact with the superposed body of air. But if the gun cotton, similarly situated, be detonated, or ignited simultaneously at many points, the combustion will become more rapid, amounting to an abrupt impact or discharge, and its destructive effects are then realized.

In a similar manner a rapid discharge of current from a highly inductive circuit, produces, through the inductance of the circuit an effect somewhat similar to that illustrated by the above analogy in which a great impedance is produced by the sudden change of current direction and the current is thereby transformed into heat, just as an impact will drive a nail while pressure of the hammer on the head of the nail will not produce the same result, for the reason that the same amount of energy cannot be communicated to the nail by pressure that can be transmitted to it by the impact of the hammer blow.

The abrupt discharge imparts great current energy in a short period of time, to the spot to be welded, thereby localizing the heat to an extent to produce a sufficient molten condition of the metal in the aforesaid region before the resulting heat can be equalized, dispersed or carried away by the heat-receiving body.

After the primary initiation of the current, the arc between the two bodies of metals to be joined by the weld is suppressed by bringing the metals into contact with each other, but the subsequently applied current from the dynamo will persist.

In the accompanying drawings I have shown, schematically, an arrangement of circuits and devices by means of which my invention may be carried into effect.

In the schematic illustration 1 represents a larger piece of metal to be welded to the smaller piece 2. 3 is a dynamo electric machine, of the constant current type, having a shunt field magnet winding 4 and positive and negative brushes 5 and 6, respectively. The positive terminal 7 of the dynamo is connected by wire 8 to a clamp 9 that holds the larger piece of metal 1. The negative terminal 10 is connected by a wire 11 to a pivoted lever 12, as at 13, the free end of which carries the smaller piece of metal 2 in any suitable manner. The lever 12 is raised by an electro-magnet 15, when it is energized, until the smaller piece of metal 2, is brought into contact with the larger piece 1. The magnet 15 may be energized by any suitable source of current supply, it being shown to receive its magnetic power from the battery 16, when the circuit including the magnet 15 is closed. A dash pot 18 has its plunger 19 connected to the lever 12, and is provided with a needle valve screw 20, which controls the extent of retardation interposed by the dash-pot, by opening and closing a perforation 21 in the dash pot to a greater or less extent. A branch circuit from the dynamo contains inductive magnets, two being shown, 23 and 24, connected in series and having high inductive capacity. The magnet 24 is connected to the terminal 25 by a wire 26, and the magnet 23 is connected by a wire 27 to a contact member 28, coöperating with the pivoted lever 29 to close the circuit over the wire 30, which is connected to the lever 12, as at 13. The current will flow primarily, through this branch highly inductive circuit, through the magnets 24 and 23, contact 28, lever 29, wire 30, back to the dynamo, through the wire 11. A solenoid 32 is contained in the branch circuit between the terminals 7 and 10 of the dynamo, by the wires 33 and 34. The latter wire contains a manually operable current initiating switch 35, consisting of a bar 36 pivoted, as at 37, adapted to make electrical connection with the terminal 38, of the switch, when it is shifted. The terminal 38 is connected to the solenoid 32 by a wire 39. If it is desirable to retard the operation of the magnet 32 in opening the circuit between 28 and 29 it may be done by the dash pot shown. Fixed to the outer free end of the lever 29 is the plunger 40 which moves in the cylinder 41 of the dash pot, the latter is adjustable to control the time period of movement of the arm 29. A needle valve adjusting screw 42 closes the perforation 43, to a greater or less extent, to vary the retarding effect of the dash pot. A switch contact 44 is connected to the contact 28 by wire 45 and a contact 46 is connected by wire 47 to the battery 16 which energizes the electro-magnet 15 when the circuit is completed over the wire 48 in contact with the wire 30.

The diagram shows all of the circuits open and the two separated pieces of metal 1 and 2 in proper positions to be welded together. The operation is as follows:—The switch 35 is closed, by moving the bar 36 into contact with the terminal 38 of the switch. This closes the circuit through the electromagnet 32, which pulls down the lever 29 to break the contact of the lever with the terminal 28. The movement of the lever 29, may, if desired, be predetermined by the dash pot 41 or it may be instantaneous. When the lever 29 moves away from the contact or terminal 28, the circuit through the magnets 23 and 24 is broken and these magnets being of high inductance capacity will discharge in the direction of the arrows so that the discharge current from the magnet circuit will pass the contact point 25 through the clamp 9 and the metal bar 1, jumping the gap between the metal bar 1 and the small piece of metal 2 to be welded thereto, thus producing an arc and over the bar 12 back over the wire 30 to the lever 29 and to the contact 44, when the lever has moved down into electrical connection with the said contact the movement of the lever between contacts 28 and 44 determines the time that the discharge circuit remains open. The highly inductive magnets will produce sufficient electro-motive-force to cause the current to jump from the metal piece 1 to the metal piece 2, after which the current will bridge this gap and spring an arc. The impact of this primary current, however, will have the desired effect to quickly heat a contracted zone in the larger piece of metal 1 to substantially welding temperature.

As soon as the circuit is closed between the bar 29 and the contact 46, the local battery 16 will energize the magnet 15 which will slowly raise the bar 12, in accordance with the adjustment of the dash pot 18. While this is taking place there is an arc maintained between the metal parts 1 and 2, and the time that this arc will persist, depends upon the time movement of the magnet armature 12. The time may be varied by adjustment of the dash pot. The magnet 15 is shown as relatively long and therefore slow acting, so as not to move the arm 12 too rapidly upon the closing of the circuit which may be supplemented by the dash pot 18 to vary the time period required for moving the bar 12 sufficiently to bring the parts 1 and 2 into actual contact and thereby the duration of the arc between these two parts may be prolonged to any extent desired. The strength of the magnet 15 will be sufficient for the pressure required for the contacting pieces of metal.

The current now will flow from the dynamo directly through the parts 1 and 2, the lever 12, and back over the wire 11, supplementing the primary effect due to the impact of current superinduced by the discharge of the magnets 23 and 24. When the weld has been completed, then the switches 35 and 50 may be opened and the current will no longer flow from the dynamo.

The movement of the lever 29 may be timed by the dash pot 41 so that the time required to open the circuit between the lever 29, the contact 28 and to close it again by the contact 44, may be regulated in coöperation with the impulse of current that is produced by the discharge of the magnets 23 and 24.

The cores 51 of the magnets 23 and 24 are, preferably, of fine iron wire, so that the discharge from them will be quick and active to produce the maximum effect.

Having described my invention, what I claim is:—

1. The electric method of welding, which consists in producing current impact between two separated bodies to be joined and then bringing the bodies into contact with each other.

2. The electric method of welding which consists in producing current impact between two separated bodies to be joined; then bringing the bodies into contact with each other and maintaining current through the bodies after subsidence of the current impulse that produces the impact.

3. The electric method of welding which consists in producing current impact between two separated bodies to be joined; then bringing the bodies into contact with each other after a predetermined time, and maintaining current through the bodies after subsidence of the current impulse that produced the impact.

4. The electric method of welding two separated bodies to be joined together which consists in producing an abrupt current discharge between the separated bodies; continuing current through the bodies after subsidence of the impulse, then bringing the bodies together.

5. The electric method of welding two separated bodies to be joined together which consists in producing an abrupt current discharge between the separated bodies; continuing current through the bodies after subsidence of the current impulse; then bringing the bodies together after a predetermined lapse of time, then applying pressure to the bodies to complete the weld.

6. The electric method of welding, which consists in producing current impact between two separated bodies to be joined and then automatically bringing the bodies into contact with each other after a predetermined adjustable lapse of time.

In testimony whereof I hereunto subscribe my name.

VINCENT G. APPLE.